United States Patent [19]
Flory et al.

[11] Patent Number: 4,472,746
[45] Date of Patent: Sep. 18, 1984

[54] CHROMINANCE CHANNEL BANDWIDTH MODIFICATION SYSTEM

[75] Inventors: Robert E. Flory, Princeton; Charles R. Thompson, Moorestown, both of N.J.

[73] Assignee: RCA Corporation, New York, N.Y.

[21] Appl. No.: 306,357

[22] Filed: Sep. 28, 1981

[51] Int. Cl.³ ............................................. H04N 5/91
[52] U.S. Cl. ................... 358/327; 358/340; 358/16; 455/103
[58] Field of Search ............... 358/330, 327, 328, 329, 358/310, 334, 12, 14, 15, 16, 340; 360/33.1, 22; 455/103, 105, 59; 370/118, 119, 80, 81, 118; 375/38

[56] References Cited

U.S. PATENT DOCUMENTS 3,255,303  6/1966  Kihara ........................... 358/330
3,871,019  3/1975  Bingham ........................ 358/12 X
4,003,077  1/1977  Hickok .......................... 358/14 X
4,090,214  5/1978  Wright .......................... 358/14 X
4,131,765 12/1978  Kahn ........................... 370/118 X

OTHER PUBLICATIONS

Warren, "Alternate Line Color Recording System", RCA Technical Notes, TN-999, Pub. Feb. 13, 1975.

Primary Examiner—Donald McElheny, Jr.
Attorney, Agent, or Firm—E. M. Whitacre; W. H. Meise; L. C. Edelman

[57] ABSTRACT

When PAL chroma signals U and V are respectively recorded in channels with bandwidths intended for NTSC chroma signals I and Q, distortion will result to one of the U or V signals due to the narrow bandwidth Q channel. To equalize this distortion between the U and V signals, they line to line alternate between the two channels. To avoid a line crawl, signals above the Q channel cut-off frequency are averaged.

18 Claims, 2 Drawing Figures

CHROMINANCE CHANNEL BANDWIDTH MODIFICATION SYSTEM

BACKGROUND OF THE INVENTION

The present invention relates to video recording a plurality of signals, and more particularly where the recording channels have unequal bandwidths.

One method of recording video signals is the so called helical scan configuration in which the tape describes at least a portion of a helix about a drum within which are rotating recording heads. The heads rotate at a rate determined by the frame rate of the television standard of the video signal being recorded. One possibility for recording NTSC signals is to have the two chroma signals (I and Q) frequency modulate carriers having frequencies of 5 MHz and 1.5 MHz respectively. These carrier frequencies are high enough to allow for sufficient deviation to provide the required channel signal to noise ratios and bandwidths of 1.5 MHz and 0.5 MHz for the I and Q signals respectively. If the signals to be recorded conform to the PAL or SECAM standards, then the frame rate, and therefore the head rotation rate, is normally lower than for the NTSC standard, which reduces the recording channel bandwidth. Further the chroma signals to be recorded (U and V for PAL, R-Y and B-Y for SECAM) require a 1.5 MHz channel bandwidth for both signals. This bandwidth requires carrier frequencies that are not realizable with at least one form of recorder, such as the "Hawkeye" manufactured by RCA Corporation, since it is beyond the frequency response limit. It is possible to use the above described NTSC recording system with 5 MHz and 0.5 MHz carriers for PAL or SECAM signals by restricting the bandwidth of one of the chroma signals, but this would result in an unacceptable picture. If both chroma signals were equally affected, the picture would be more acceptable.

It is therefore desirable to use unequal bandwidth transmission channels with a plurality of signals so that the signals are equally affected.

SUMMARY OF THE INVENTION

Method and apparatus for transmitting a plurality of signals of respective bandwidths in a plurality of channels of respective bandwidths, at least one signal having a bandwidth greater than the bandwidth of at least one channel, comprising successively applying said signals to at least said one channel.

DETAILED DESCRIPTION

Figure 1:
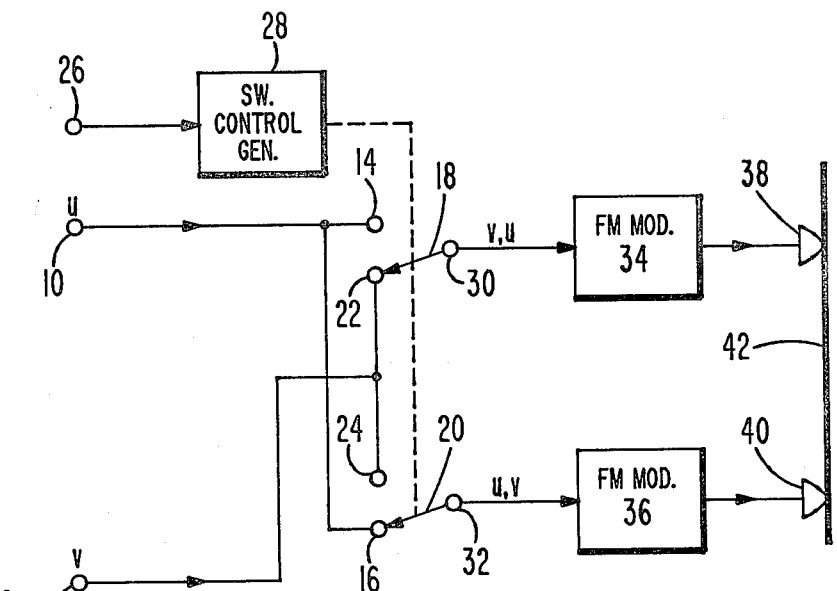
FIG. 1 is a block diagram of a recording system in accordance with the invention.

FIG. 1 shows a multiplexer having input terminals 10 and 12 for respectively receiving U and V chroma signals which chroma signals can be derived from a color camera, a video recorder or other signal source. Alternately, R-Y and B-Y chroma signals could be used with the present invention. The U signal is applied to terminals 14 and 16 of switches 18 and 20 respectively, while the V signal is applied to terminals 22 and 24 of switches 18 and 20 respectively. Input terminal 26 receives a horizontal synchronization signal from either a source associated with the source of the chroma signals or from an independent source such as a master synchronization generator that is controlling both the present invention and the chroma signal source. Since the U and V signals contain the horizontal sync signal, another possibility for deriving said signal is by use of a sync separator having an input coupled to either of terminals 10 and 12. The sync signal at terminal 26 is applied to switching control generator 28 such as a flip-flop circuit that changes state on either the leading or trailing edge of the horizontal synchronization signal. The one-half line frequency output signal from generator 28 is applied to switches 18 and 20 for control of the state thereof as indicated by dotted lines. Due to the frequency of the control signal it will be appreciated that although switches 18 and 20 are shown for simplicity as mechanical switches, electronic switches are required in practice.

The output signals from contacts 30 and 32 of switches 18 and 20 comprise line alternating U and V signals which are respectively applied to frequency modulators 34 and 36. Modulators 34 and 36 use the input signals to frequency modulate carriers of 5 MHz and 1.5 MHz respectively. The resulting FM signals are respectively applied to recording heads 38 and 40, which record on separate tracks (not shown) on a moving magnetic recording tape 42. Although tape 42 is shown as a straight line for purposes of simplicity, it will be appreciated that in a preferred embodiment it is wrapped about a drum having rotating heads 38 and 40 therein, as is known in the art. The channels have bandwidths of about 1.5 MHz and 0.5 MHz respectively. Since line alternating U and V signals are applied to each of these channels, the U and V signals are equally affected by the narrow bandwidth channel although on different scanning lines.

Figure 2:
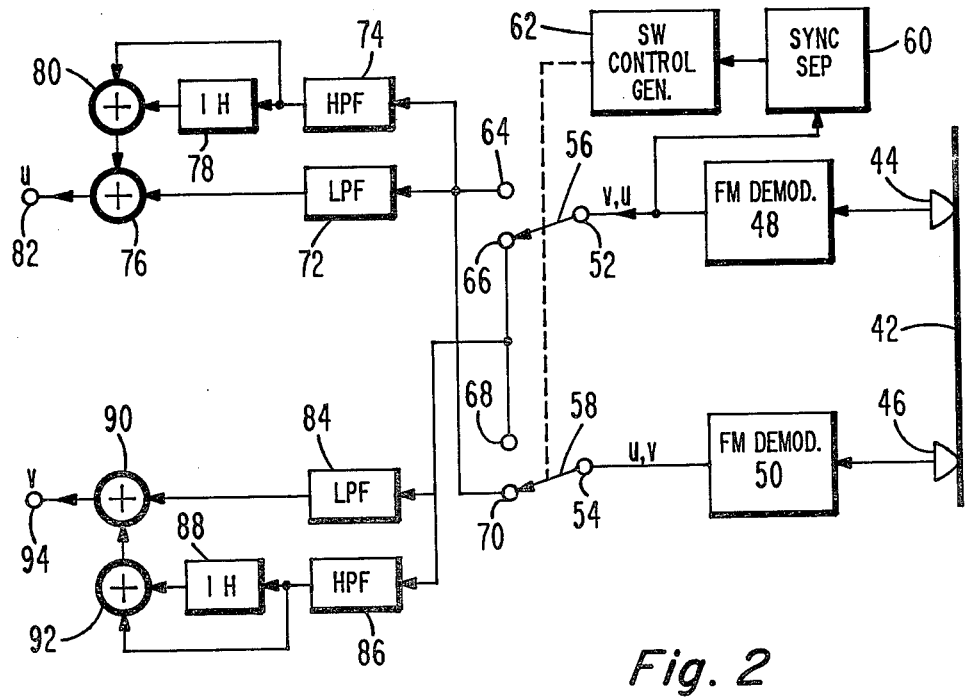
FIG. 2 is a block diagram of a playback system for use with a tape recorded with the system of FIG. 1.

A demultiplexer which would be essentially the reverse of the multiplexer of FIG. 1 could be used for playback of the signals. However, since the pulse rise time response of the two channels differ, adjacent raster lines are different and a residual artifact may be seen when using this playback system as a line crawl (a stationary serration), which occurs on sharp vertical edges at high color saturation. It is possible to remove this artifact by averaging two adjacent lines. The averaging of lines, however, results in a loss of vertical resolution. Since the two channels are identical at frequencies below the cutoff frequency ($f_1$) of the narrower channel, there is no rise-time difference below $f_1$. Thus, the averaging can be limited to frequencies above $f_1$. This may be accomplished by preceding the averaging process by a high-pass filter with a cut-off frequency approximating the cutoff frequency $f_1$ of the narrower recording channel. FIG. 2 shows an embodiment to implement this process, wherein there is no loss of vertical resolution at frequencies below $f_1$.

Tape 42 moves past two playback heads 44 and 46, which heads reproduce the FM signals recorded on tape 42, and wherein head 44 reproduces the wider bandwidth channel. The reproduced signals from heads 44 and 46 are applied to FM demodulators 48 and 50 respectively. The demodulators provide baseband video signals to contacts 52 and 54 respectively of switches 56 and 58 respectively. In addition, the horizontal synchronization signal is derived from the output signal of demodulator 48 by sync separator circuit 60. In general, it is desired to derive the sync signal from the broader bandwidth channel for improved resolution of the leading and trailing edges of the sync pulse. The synchronization signal is applied to switching control generator 62 which may be identical to generator 28 in FIG. 1. The one-half line frequency output signal from generator 62 is used to control the switching state of switches 52 and 58 as indicated by dotted lines.

Switch 56 always applies during one line the U signal to output signal 64 and during the next line, the V signal to output contact 66, while switch 58 applies during said one line the V signal to output contact 68 and during said next line the U signal to output contact 70. The U signal from contacts 64 and 70 is applied to a frequency splitting filter including LPF (low pass filter) 72 and to an HPF (high pass filter) 74 each having cutoff frequencies of $f_1$. The output signal from LPF 72 is applied to adder 76. Thus, the low frequency portion of the U video signal is unaveraged. The output signal from HPF 74 is applied to 1H (one horizontal line time of the television standard that was recorded) delay line 78 and to adder 80. The output signal from 1H delay line 78 is also applied to adder 80. The output signal from adder 80 thus comprises high frequency portions from adjacent lines that have been added to elimintae color dot crawl. This output signal is then added to the unaveraged low frequency portion by adder 76. The final reconstituted U signal is now available at output terminal 82. The V signal from contacts 66 and 68 undergoes identical processing in a circuit comprising HPF 84 and LPF 86 each having cutoff frequencies of $f_1$, 1H delay line 88, and adders 90 and 92, and is available at output terminal 94. The U and V signals at terminals 82 and 84 are then sent to an encoder (not shown) where they are combined with the luminance signal, which can be conventionally recorded on a separate track (not shown), to produce red, green, and blue signals, which are then displayed.

It will be appreciated that many other embodiments are possible within the spirit and scope of the invention. For example, the invention can be applied to transmission channels other than tape recorders. Furthermore, the distortion occassioned may result from differences between the channels in their response to signals of different amplitudes, rather than to differences in frequency. Such a difference might be, for example, a difference in differential gain or differential phase.

What is claimed is:

1. A method of transmitting first and second signals of respective bandwidths in first and second channels of respective bandwidths, said first signal having a bandwidth greater than the bandwidth of said first channel, said method comprising alternately applying said first signal to said first and second channels while alternately aplying said second signal to said second and first channels; whereby the distortion producing limited bandwidth of said first channel is distributed over said first and second signals.

2. An apparatus for transmitting first and second signals of respective bandwidths, said apparatus comprising first and second transmission channels of respective bandwidths, said first signal having a bandwidth greater than the bandwidth of said first channel, and applying means for alternately applying said first signal to said first and second channels while alternately applying said second signal to said second and first channels; whereby the distortion producing limited bandwidth of said first channel is distributed over said first and second signals.

3. An apparatus as claimed in claim 2, wherein said signals comprise U and V components of a PAL video signal.

4. An apparatus as claimed in claim 2, wherein said signals comprise R-Y and B-Y components of a SECAM video signal.

5. An apparatus as claimed in claim 2, wherein only one of said signals has a bandwidth greater than only one of said channels.

6. An apparatus as claimed in claim 2, wherein said applying means applies said first and second signals to said first and second channels for equal durations.

7. An apparatus as claimed in claim 2, wherein said first and second signals comprise video color component signals and said applying means applies said signals to said channels for the duration of one line.

8. An apparatus as claimed in claim 2, further comprising a receiver apparatus comprising first and second output channels and demultiplexer means for applying said claim 8 first and second signals to said first and second output channels respectively.

9. An apparatus for receiving first and second signals of respective bandwidths, transmitted in first and second transmission channels of respective bandwidths, said first signal having a bandwidth greater than the bandwidth of said first channel, said first signal being alternately applied to said first and second channels while said second signal is alternately applied to said second and first channels, said receiving apparatus comprising first and second output channels and demultiplexer means for applying said first and second signals to said first and second output channels respectively; whereby the distortion producing limited bandwidth of said first channel is distributed over said first and second signals.

10. An apparatus as claimed in claims 8 or 9 wherein said signals comprise video color component signals.

11. An apparatus as claimed in claim 10, wherein each of said output channels comprises means for one line averaging signals having frequencies above the bandwidth limit of said first channel.

12. An apparatus as claimed in claims 8 or 9 wherein each of said output channels comprises means for averaging signals having frequencies above the bandwidth limit of said first channel.

13. A television transmission system for transmitting color television signals including two components through first and second channels said first channel having a transmission characteristic capable of distorting a component signal passing therethrough, said system comprising:
controllable multiplexing means coupled to the source of component signals and to said first and second channels for controllably coupling said first and second components of said color television signal to said first and second channels; and
control means coupled to said multiplexing means for operating said multiplexing means at a television synchronizing rate for alternately coupling said first component of said color television signal sequentially to said first and second channels while alternately coupling said second component of said color television signal sequentially to said second and first channels; whereby the distorting effects of the channels are distributed over the components of said color television signal which are so sequenced.

14. A system according to claim 13 further comprising:
receiving means coupled to said first and second channels, said receiving means including controllable demultiplexing means coupled to said first and second channels for controllably coupling the signals of said channels to separate utilization means for said first and second components of said color television signal and for coupling the signal then being transmitted through a channel to a utilization means; and
demultiplexer control means coupled to said demultiplexing means and operated at said television synchronizing rate for coupling said first and second components with its distributed distortion to its respective utilization means.

15. An apparatus for transmitting U and V components of a PAL video signal, said components having a selected bandwidth, said apparatus comprising first and second transmission channels of respective bandwidths, said selected bandwidth being greater than the bandwidth of at least one of said channels, and applying means for alternately applying said U component to said first and second channels while alternately applying said V component to said second and first channels; whereby the distortion producing effect of the limited bandwidth of said one channel is distributed over said components.

16. Apparatus as claimed in claim 15, wherein said first and second transmission channels comprise the I and Q chroma signal processing channels of an NTSC video tape recorder.

17. An apparatus for transmitting R-Y and B-Y components of a SECAM video signal, said components having a respective bandwidth, said apparatus comprising first and second transmission channels of respective bandwidths, said selected bandwidth being greater than the bandwidth of a least one of said channels, and applying means for alternately applying said R-Y component to said first and second channels while alternately applying said B-Y component to said second and first channels; whereby the distortion producing effect of the limited bandwidth of said one channel is distributed over said components.

18. Apparatus as claimed in claim 17, wherein said first and second transmission channels comprise the I and Q chroma signal processing channels of an NTSC video tape recorder.

* * * * *

UNITED STATES PATENT AND TRADEMARK OFFICE
CERTIFICATE OF CORRECTION

PATENT NO. : 4,472,746
DATED : September 18, 1984
INVENTOR(S) : Robert Earl Flory, et al.

It is certified that error appears in the above-identified patent and that said Letters Patent is hereby corrected as shown below:

On the title page;

Applicant's Claim for Priority Under 35 U.S.C. 119, for UK patent application No. 8102282 filed 26 January 1981 is to be acknowledged on the face thereof.

Signed and Sealed this

Fifteenth Day of October 1985

[SEAL]

Attest:

DONALD J. QUIGG

Attesting Officer

Commissioner of Patents and Trademarks—Designate